UNITED STATES PATENT OFFICE.

CHARLES A. CATLIN, OF PROVIDENCE, RHODE ISLAND.

BAKING-POWDER.

SPECIFICATION forming part of Letters Patent No. 239,602, dated April 5, 1881.

Application filed February 18, 1881. (No specimen.)

*To all whom it may concern:*

Be it known that I, CHARLES A. CATLIN, of Providence, in the State of Rhode Island, have invented a new and useful Improvement in Yeast or Baking Powders, which improvement is fully set forth in the following specification.

This invention has general reference to the compounds known as yeast or baking powders, consisting of an acid or acid salt mixed with the proper proportions of an alkaline carbonate or bicarbonate, and used in bread-making, in order to attain an evolution of carbonic acid within the dough by the action of the acid or acid salt upon the carbonate or bicarbonate.

Various acids and acid salts have heretofore been used, the most common being tartaric acid free or combined with potassa, in the form of a bitartrate, (cream of tartar,) acid phosphates, and alum. The last named, (alum,) both on account of its low price and superior keeping quality, in admixture with a carbonate, seems pre-eminently adapted to the purpose, and would doubtless be universally employed were it not that its use is attended by the introduction into the bread or food of a popularly-supposed injurious or unhealthful element in the aluminum compound contained therein.

The present invention has for its object to provide a material or preparation that may be used in the composition of baking-powders that will possess the valuable keeping qualities of alum without its objectionable qualities, and is based upon the application to the purpose of the sulphate of magnesium, which possesses the property of decomposing alkaline bicarbonates, and of liberating from them, on the application of heat, the greater part of their carbonic acid.

In carrying out the invention I proceed as follows:

Ordinary crystallized magnesium sulphate is dried by a gentle heat until the greater part of its water of crystallization is driven off and it slakes to a fine dry powder. This is then mixed with a proper equivalent of alkaline bicarbonate to form a baking-powder—say, six parts, by weight, of magnesium-sulphate to seven parts of bicarbonate of sodium or eight parts of bicarbonate of potassium. This constitutes one method of carrying out the invention. The best results are, however, obtained by the use of the magnesium sulphate in connection with the sulphate of ammonium, in the form of a double sulphate or mixture of the two sulphates, and also in connection with cream of tartar, or its substitutes, (acid phosphate, for example,) as the salt or preparation containing the same being, when dry, practically as inert as starch, and yet contributing to the effective strength of the compound, finds in such connection its most efficient and acceptable use.

Sulphate of ammonium of commerce (usually containing about twenty-five per cent. of ammonium) is dissolved in boiling water in proportion of thirty pounds of the sulphate to five gallons of water, and while the solution is still hot it is filtered to remove the insoluble impurities. To the resulting clear solution is added gradually, with stirring, sulphate of magnesium, (ninety pounds,) in fine crystals. A thin mush is thus formed, and with it starch (sixty pounds) is intimately mixed. The result is a plastic mass, which is spread upon a dry floor, and in a few days becomes dry and crystalline. The dry material is then broken up into small granules by grating it through a coarse wire sieve. It is then dried by hot air and ground into powder. This dry powder is mixed with cream of tartar, or its substitute of like strength, in the proportion, say, of one of the powder to two of the cream of tartar. This proportion can be increased or diminished, if desired. Twenty (20) parts of the mixture thus made will decompose eight (8) parts of bicarbonate of soda. The baking-powder obtained by mixing these materials in the proportions indicated is superior to one containing twenty (20) parts of cream of tartar and nine (9) parts of bicarbonate of soda. The raising effect is greater, on account of the ammonia, although less bicarbonate is used. The sulphate of magnesium, without the ammonium salt, can also be used in connection with cream of tartar. A good proportion is five (5) parts of the magnesium sulphate and twenty (20) parts of cream of tartar, (or its substitute, of like strength,) to fourteen (14) parts of sodium bicarbonate. A diluent, such as starch, can be added, the best method being to dissolve the salt in water, and after filtering to add the starch, in the proportion of about ten (10) parts of starch to ten (10) parts of the dry salt, thus forming a pasty mass, and then to evaporate the water.

In an application for Letters Patent filed November 3, 1880, of which this is a division, I have described and claimed a cream-of-tartar substitute, having as an active ingredient sulphate of ammonium, and a baking-powder comprising such a preparation in admixture with alkaline carbonate. I have also stated therein that the best method of using the ammonium sulphate is to employ it in connection with the sulphate of magnesium and cream of tartar, or its substitute, substantially as set forth above. I would observe, therefore, that I do not claim herein a cream-of-tartar substitute free from aluminium compounds and having as an active ingredient the sulphate of ammonium, nor a baking-powder made therewith, since this is claimed in my said application of November 3, 1880; but a cream-of-tartar substitute or baking-powder containing both the ammonium and magnesium sulphates in the form of a double salt or mixture of two salts would, it is obvious, embody the present invention, as well as that forming the subject of my aforesaid application, because it contains magnesium sulphate as an active ingredient without association or combination with objectionable substances, such as aluminium compounds.

Having now fully described the said invention, and the manner of carrying the same into effect, what I claim is—

1. A cream-of-tartar substitute as described, being a pulverulent preparation free from aluminium compounds, and containing as an active ingredient sulphate of magnesium, substantially as set forth.

2. A baking or effervescent powder comprising, in admixture with alkaline carbonate, a pulverulent preparation, substantially as described, the said preparation containing as an active ingredient sulphate of magnesium, and being free from aluminium compounds, as set forth.

In testimony whereof I have signed this specification in the presence of the subscribing witnesses.

CHAS. A. CATLIN.

Witnesses:
SAML. A. NIGHTINGALE,
J. W. DAVENPORT,
GEORGE H. BURNHAM.